June 17, 1941.  R. D. HICKOK  2,245,781
ELECTRICAL METER
Filed March 2, 1939  2 Sheets-Sheet 1

INVENTOR
ROBERT D. HICKOK
BY Hyde, Higley & Meyer
ATTORNEYS

June 17, 1941.    R. D. HICKOK    2,245,781
ELECTRICAL METER
Filed March 2, 1939    2 Sheets-Sheet 2

INVENTOR
ROBERT D. HICKOK
BY
ATTORNEYS

Patented June 17, 1941

2,245,781

UNITED STATES PATENT OFFICE 2,245,781

ELECTRICAL METER

Robert D. Hickok, Bratenahl, Ohio, assignor to Cleveland Patents, Incorporated, Cleveland, Ohio, a corporation of Ohio Application March 2, 1939, Serial No. 259,344

7 Claims. (Cl. 171—95)

This invention relates to electric meters and more particularly to the operating mechanism or "movement" and to the mounting thereof in the energizing permanent magnet.

One object of the invention is to provide an improved meter movement which is very accurate, which has high efficiency, and which is unusually compact especially in its over-all dimension along the axis of the movable element.

Another object is to provide an improved meter movement which is unusually compact, but nevertheless is capable of construction and assembly at relatively low cost.

Another object is to provide an improved meter movement made of several parts or pieces connected together and of such form as to be capable of quantity production by simple stamping, punching and like operations, and hence at low cost, all without sacrifice in sensitivity, accuracy, ruggedness or durability.

A further object is to provide an instrument movement of this kind in which, by simple modifications in the shapes of one or a few of the parts, the movement may be made more or less sensitive in different zones of its scale range, such as with maximum sensitivity in the zone of lower, intermediate or higher scale values, and with reduced sensitivity in the remaining zone or zones.

Still another object is to provide an improved meter movement embodying a moving coil in which the coil, core and pole pieces are so constructed and are so relatively arranged as to include the maximum proportion of the coil turns within the magnetic field, thereby increasing efficiency of the instrument as a whole and at the same time providing increased sensitivity, by increase in the torque made effective upon the moving parts.

Still another object of the invention is to provide an improved meter movement embodying a moving coil whose over-all length, along the coil axis, is considerably less than its over-all width, transversely of the coil axis, the width and length being in the relative proportions of six or eight to one or even in greater proportion.

Further objects of the invention are in part obvious and in part will appear more in detail hereinafter.

In the drawings, Fig. 1 represents a top plan view of one form of meter movement embodying the invention, the indicating scale being shown diagrammatically or conventionally;

A meter movement made according to the present invention follows standard practice in its employment of a permanent U-shaped magnet whose poles are provided with attached pole pieces enclosing or forming a magnetic field in which is suspended a stationary soft iron core, together with a rotating coil the turns of which move in the gap between the pole pieces and core and by their intersection of the lines of magnetic flux produce a torque effect turning the moving coil in a certain proportion or relation to the current flowing therein. But the construction and relative arrangement of all of said parts in accordance with my improvement now to be described entail and produce the novel and advantageous results earlier referred to.

Of course, a meter movement of this kind, because of the delicacy of its parts, is usually housed or enclosed in a casing which may also enclose or form a support for other parts with which the movement is associated physically or electrically in the instrument of which the movement forms a part. Since neither the casing nor the manner of mounting the movement therein or of associating the parts of the meter movement electrically or otherwise with other members of the electrical circuit of which it always forms a part, form a part of the present invention, they are not illustrated and need not be referred to in detail. Obviously the meter movement may be used as the basis for any kind of electrical meter or instrument in the same way as other movements of this general class.

Figure 1:
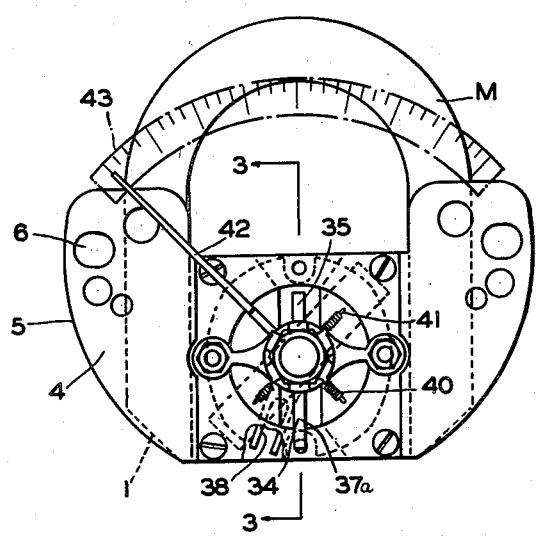
Figure 2:
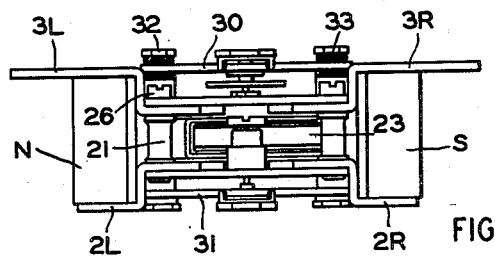
Fig. 2 is an end view, looking at the movement from the bottom in Fig. 1.
Figure 3:
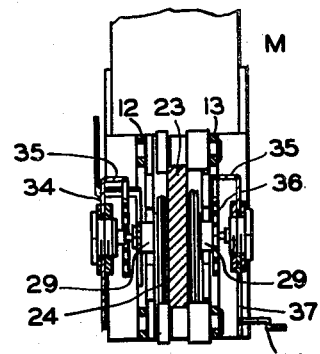
Fig. 3 is a detail sectional elevation on the line 3—3, Fig. 1.

In the arrangement shown in Figs. 1, 2 and 3, the permanent magnet M is of usual horseshoe form provided with parallel arms forming a north pole N and a south pole S, both of rectangular form in cross section, as shown in Fig. 2, but usually bevelled off outwardly in plan view, as at 1, to conform or accommodate them to a circular or curved casing or enclosure.

The meter movement also includes suitable pole pieces, here of special form and made of several parts firmly and more or less detachably connected in a manner to reduce the cost of their initial production and assembly. Each pole piece includes a pair of upper and lower pole plates, so that the unit as a whole includes four plates in all, to wit, two bottom pole piece plates, to-wit, the left hand pole piece plate 2L and the right hand pole piece plate 2R and two top left and right pole piece plates 3L, 3R. The outer portions thereof are shaped to form the mount by means of which they are assembled with and on the magnet poles. For example, the outer cheek portions 4 of the top plates 3L, 3R are shown in Fig. 1 as of wing form extending across and even beyond the upper faces of the magnet poles which they hug, said wings 4 having their outer edges 5 curved to fit a curved enclosing case and also having one or several openings 6 variously located for the attachment of other parts, for receiving attaching screws going into openings in or clamping against the magnet poles, or even to reduce the weight or for other reasons.

Intermediate their inner and outer edges plates 3L, 3R, are bent downwardly at right angles to form a wall 7 shaped to hug the inner surface of the adjacent magnet pole N or S, and inwardly beyond said wall are again bent at right angles to form pole portions 8 of wing form parallel to but offset from the wings 4.

Figure 7:
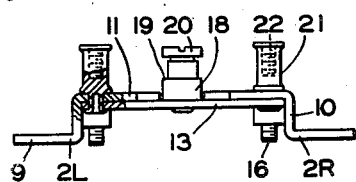
Fig. 7 is a similar view, partly in section, illustrating the bottom pole piece plates and the bottom separating plate assembled.
Figure 8:
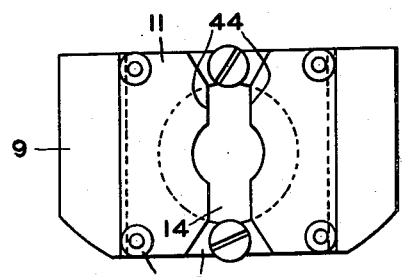
Fig. 8 is a top plan view of the parts shown in Fig. 7.
Figure 9:
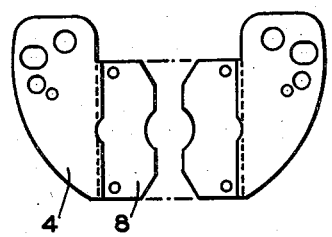
Fig. 9 is a top plan view of the top pole piece plates.

The bottom pole plates are generally similar to the top plates, but complementary in that they are bent upwardly instead of downwardly. Their outer mounting cheek parts 9 may be of the same or approximately the same shape as the wings 4 of the upper plates, but they need not be so large or so extensive and are shown in Figs. 2, 7 and 8 as simple flanges lying parallel to and hugging the lower surfaces of the magnet poles N, S. Their intermediate wall portions 10 extend vertically in Fig. 2, hugging the inner surfaces of the poles N, S, and their inner pole portions 11 are parallel to and usually of substantially the same shape in plan view as the upper pole portions 8.

For securing together the several parts of the pole pieces, I provide upper and lower separator plates 12, 13 respectively, both made of non-magnetic material, such as aluminum, brass, copper or the like, as contrasted with the ferrous or other magnetic material of which the pole pieces and core are made.

Figure 4:
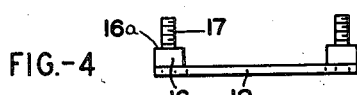
Fig. 4 is an end edge view of the top separating plate.
Figure 5:
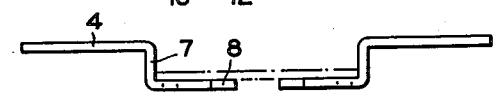
Fig. 5 is a similar view of the top pole piece plate.
Figure 17:
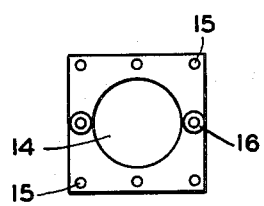
Fig. 17 is a top plan view of the bottom separating plate.

The two separator plates 12, 13 are generally similar, both being square, as shown, with a central circular hole 14 and four small holes 15, one in each corner, for attaching purposes, as shown in Fig. 17. Each separator plate, between its corners, on each of two opposite edges, is provided with a rigid post 16 having a shoulder 16a, and beyond said shoulder a reduced threaded shank 17 (Fig. 4). These posts form mounts or supports for jewel frames, later to be referred to. They project upwardly from the upper plate (Fig. 4) and downwardly from the lower plate (Fig. 7).

In addition to its two downwardly projecting posts 16, the lower separator plate 13, between its corners and along each of its other two edges, is provided with an upwardly projecting post 18 having a reduced end portion forming a shoulder 19 and at its end having a threaded opening to receive a clamping screw 20. These two opposite posts 18 form supports for the core, as will later appear.

While any suitable securing means may be employed, the parts are assembled and are held together as follows:

The two bottom pole plates 2L, 2R are permanently attached to their separator plate 13 in the manner shown in Fig. 7, to-wit, by riveting, the rivets used consisting of posts 21 made of magnetic or non-magnetic material and having threaded openings 22 at their upper ends, their reduced lower end portions being passed through holes in the inner plate parts 11 and then through the holes 15 in the corners of the separator plate, below which the reduced post ends are headed over, as shown in Fig. 7. This leaves the four corner posts 21 and the two side posts 18 upstanding from, and the side posts 16 depending from the bottom separator plate.

Figure 6:
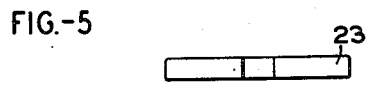
Fig. 6 is a similar view of the core.
Figure 10:
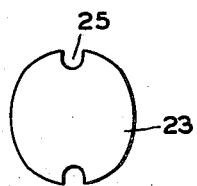
Fig. 10 is a top plan view of the core shown in Fig. 6.

The core 23 (Figs. 6 and 10) is now laid in place with the moving coil member 24 (Figs. 18 and 19) embracing it. Coil member 24 will be described later. Core 23 is made of ferrous or other suitable magnetic material. Generally speaking, it is of plate or disc form having two opposite open recesses 25, the edges of which closely embrace the reduced portions of the mounting posts 18, so that said core is supported upon the shoulders 19, against which it is clamped and firmly held by the large heads of the clamping screws 20.

Now the upper pole plates are fastened in place. The two upper pole plates 3L, 3R of a pair are assembled with an upper separator plate 12, and the three parts together are secured to each other and to the lower parts by screws 26 threaded through members 12 and 8 into the threaded openings at the upper ends of posts 21.

Figure 18:
Fig. 18 is an end view of the moving coil and Fig. 19 is a side elevation thereof.
Figure 19:

The moving coil member 24, instead of being of nearly equal height and width when viewed endwise, as is usual, in this case is low and wide, as shown in Fig. 18. Its height is greatly reduced, enabling the over-all height of the entire instrument to be reduced, and its width is considerably increased. Indeed, the coil member may be as much as six, eight or more times as wide as it is long, because its width is increased and its height is reduced, the number and length of its turns of wire need not be reduced and indeed may be increased, in addition to which, by reason of its relation to the pole pieces and core, the proportion of its wire intersecting the magnetic field is increased, with an over-all increase in efficiency which in practice has amounted to as much as 15% to 20% over the efficiency of the coils in standard forms of instrument of this kind.

The coil member 24, physically, is of the usual form, consisting of a tubular form 27 made of aluminum, copper, or other non-magnetic metal of high electrical conductivity, for damping purposes, and upon which form the turns of insulated wire 28 are wound. In operation the coil rotates about the central axis of the movement—an axis normal to the plane of and at the center of the core. Its moving parts, including the wire turns, swing in the gap or air space between the core and pole pieces. To support said coil it has physically attached thereto in any suitable manner, as by glue or cement, two opposite pivot end blocks 29, the pivots at the ends of which seat in jewels or bearings carried by upper and lower jewel mounts, marked respectively 30, 31, and made of non-magnetic material. Each of these mounts is of bridge form and is carried by two opposite posts 16 to which it is secured by screws 32. One of said jewel mounts may be in electrical contact with its posts so that the magnet frame, pole pieces and other parts will form one side of the electrical coil circuit adapted for connection to any part thereof of a binding post or lead wire, while the other jewel mount may be insulated from its posts by insulating washers 33, if desired.

Each jewel mount carries a rotatably adjustable current conducting two armed member 34, frictionally held thereon, and to one of the arms 35 of which one end of the wire of the coil is connected through a coiled hair spring 36 as is customary. The other arms 37 of one of said members may be forked as at 38 to receive an arm 39 of the usual zero adjusting device, while the other arm 37a of the other member furnishes a means of connection to the other side of the electrical coil circuit.

The two pivot blocks 29, both of which turn with the moving coil, may each be provided with adjustable balancing devices, such as small spring wire coils 40 mounted on radiating arms 41, and one of said blocks 29 will have attached thereto a pointer 42 adapted to travel over a suitable scale conventionally illustrated at 43, and which may be inscribed on the casing or a plate or window attached thereto, as is usual.

When the pole pieces have been assembled with the core, coil and the jewel mounting bridges, the self-contained unit thus formed may be assembled with a permanent magnet by pushing the poles of the magnet into the channels formed by the wings 4 and 9 and walls 7 and 10. The metal of the pole pieces is strong resilient sheet metal, but the parts can be worked up with close tolerance so that by pushing the magnet into position the pole pieces and their attached parts and the magnet will be held together frictionally by the spring of the resilient metal, but attaching screws may be used if desired.

It will be observed that in this arrangement the inner edges 44 of the pole pieces are separated but lie generally parallel and opposite to each other. The inner parts 8 and 11 of the upper and lower pole plates are of the same shape and lie in parallel planes, but by reason of the offsetting of the inner parts 8 and 11 of the pole pieces from their outer parts 4 and 9, plates 8 and 11 have been brought into fairly close juxtaposition, being separated only by the thickness of the core 23 and the air gap between the flat surfaces of the core and the plates 8 and 11 in which the coil member turns. The outer edge of the core 23 is also fairly close to the magnet poles N, S, forming another narrow gap in which the short longitudinal portions of the coil rotate. As a consequence the coil member turns in a very narrow gap or space between the core and the magnet poles and its attached pole pieces. Of course, the strength of the magnetic field varies in different portions thereof, being stronger where the gap between the pole pieces and core is reduced. In this instrument practically every portion of the wire on the coil member, excepting only a very small part at or near the pivotal axis, lies and moves in a very narrow air gap. The consequence is that the power and efficiency of the instrument are a maximum and in practice have been observed to be as much as 15% to 20% greater than those of instruments of ordinary design. By offsetting the inner portions of the pole pieces and bringing closer together the inner portions of the top and bottom plates, all the working parts of the movement, including the core, the coil 24, the hair springs and the jewel mount seats for the ends of the oscillating coil shaft, have been compressed into and lie within the space between the magnet poles N, S, and more particularly between the planes of the upper and lower surfaces of the magnet, substantially no parts extending beyond said space except parts of the attaching screws, a portion of one of the jewel mounts, and necessarily also the pointer 42. By compression of the parts into the said space and use of the short side coil member, the over-all height of the instrument has been very materially reduced as compared with instruments of standard form.

Again, with an instrument of this kind the cost of construction and assembly has been very materially reduced. All of the several parts of the core, pole pieces and separator plates are individually of simple form capable of being made from sheet metal by simple stamping, punching and like operations, so that these several parts can be made cheaply and yet of accurate form, and may be assembled by simple operations, such as the simple riveting operation described and the attachment of parts to each other by screws.

Furthermore, by simple change in the shapes of either or both of the inner portions 8, 11 of the pole pieces and the core, it is possible to adapt the movement to varying degrees of sensitivity in different zones of its scale range.

For example, in the form shown in Figs. 1 to 10 inclusive, the inner parts 8, 11 of the pole pieces and the core 23 are of substantially full area and the instrument has substantially uniform sensitivity throughout its entire scale range.

Figure 11:
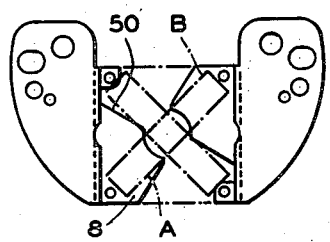
Fig. 11 is a view corresponding to Fig. 9, and illustrating a modified form of the top pole piece plates.
Figure 13:
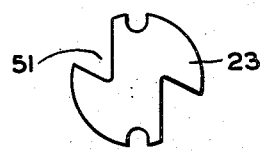
Fig. 13 is a top plan view, illustrating the core for use with the pole piece plates of Figs. 11 and 12.
Figure 12:
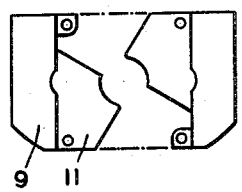
Fig. 12 is a top plan view, corresponding to Fig. 8, and illustrating the bottom pole piece plates for use with the top pole piece plates of Fig. 11.

In the arrangement shown in Figs. 11, 12 and 13, however, portions of the inner parts 8 and 11 of the pole pieces have been omitted by punching or shearing them out in the original plate forming operation. Referring to Fig. 11, full swinging movement of the coil carries it in the clockwise direction from its zero position A to its fully advanced position B. During the first portion of its movement it travels between the pole plate parts 8, 11, but about midway of its swing, or just a little beyond, it passes the end edge 50 of the plates 8, 11 and during the latter part of its swing travels in a materially lengthened air gap. The core 23 for this form may also be notched and recessed, as at 51, to correspond with the pole pieces, although this is not necessary, whether to specially form either the core alone, or the pole pieces, or both, depending upon the particular results desired.

With an instrument designed as described sensitivity will be a maximum during the first half of the travel of the coil and a minimum during the second half. For example, in one arrangement of this kind, with pole pieces and core of the kind shown in Figs. 11 to 13, and with the proper winding on the moving coil, its required sixteen milliamperes to cause the coil and pointer to move over the first half of the scale, but a total of three hundred milliamperes to cause the coil and pointer to move over the last half of the scale to full scale position. Such an arrangement is advantageous where extra sensitivity is desired in the low scale range, such as in light meters or instruments of that kind.

Figure 14:
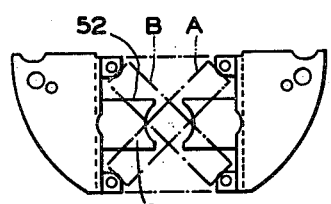
Figs. 14, 15 and 16 are views corresponding respectively to Figs. 11, 12 and 13, and showing still other forms of top and bottom pole piece plates and core.
Figure 16:
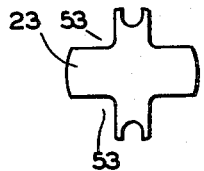
Figure 15:
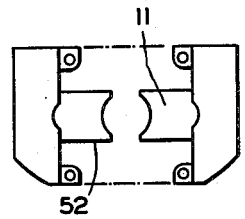

In the arrangement shown in Figs. 14 and 15, portions of the inner plates 8, 11 have been omitted or cut away toward the ends of the zone of movement of the moving coil, the lines 52 indicating the edges of the metal retained in the intermediate or central zone of the scale range. Also, the core 23 for this movement is recessed at 53 to correspond with the pole pieces. With an arrangement of this kind high sensitivity is secured in the middle or intermediate zone of the scale range, an arrangement useful, for example, in zero centered galvanometers.

Many other shapes and configurations of pole pieces and core may be selected to adapt the movement to any desired degrees in sensitivity in different zones of the scale range.

When posts 21 are made of magnetic material they tend to concentrate and strengthen the magnetic field opposite said posts, with corresponding increase in sensitivity of the instrument when the coil is opposite one or the other of said posts. Such increase in sensitivity at these zones at times is of value and posts made of magnetic material consequently may be employed, but where variation in sensitivity is undesirable the posts may be made of nonmagnetic material so that they will not produce variations in the strength of the magnetic field.

While in the foregoing specification and in the claims to follow reference has been made to the height of the instrument, to upper and lower pole piece plates, to the vertical axis of rotation of the coil, etc., such terms or phrases, based upon the instrument lying in a horizontal position, such as flat upon a table, are employed only for convenience in description, it being understood that in use the instrument may be held in any position, with the axis of coil rotation horizontal, vertical with either end up, or in any angular position.

Other advantages of the invention will be apparent to those skilled in the art.

What I claim is:

1. Meter mechanism of the character described, comprising a permanent magnet having parallel opposed pole arms, and a self contained, unitary movement removably assembled therewith, said movement including a frame having two pole pieces adapted for assembly with or removal from the magnet by sliding motion lengthwise of its poles, each pole piece including two paired upper and lower plate members formed of magnetic sheet metal and providing outer cheek portions lying in parallel planes and embracing the magnet pole between them, and inner parallel plate portions offset toward each other into closely spaced parallel relation, a thin wafer-like core member mounted immovably in said frame and lying between said inner plate portions, and a coil rotatable in a narrow gap between said core member and said inner plate portions.

2. Meter mechanism of the character described in claim 1, said core and pole piece members being formed of sheet metal capable of fabrication by punching or shearing operations and said pole piece members of resilient metal adapted to resiliently clamp the magnet poles with which they are assembled.

3. Meter mechanism of the character described in claim 1, said core and pole piece members being formed of sheet metal capable of fabrication by punching or shearing operations, and at least one thereof having a portion sheared away to modify the flux through the coil in that zone of coil movement.

4. Meter mechanism of the character described in claim 1, said inner plate portions, core member, and coil lying within the space between the planes of the upper and lower surfaces of the magnet poles.

5. Meter mechanism of the character described in claim 1, said inner plate portions, core member, and coil lying within the space between the planes of the upper and lower surfaces of the magnet poles, and jewel mount seats carried by said frame and supporting said coil and also lying within said space.

6. Meter mechanism of the character described in claim 1, said inner plate portions, core member, and coil lying within the space between the planes of the upper and lower surfaces of the magnet poles, jewel mount seats carried by said frame and supporting said coil member, and hair spring means effective upon said coil member, said jewel mount seats and hair spring means also lying within said space.

7. Meter mechanism of the character described in claim 1, including separator plates of nonmagnetic material cross connecting the plate portions of said pole pieces, jewel mount seats carried by said separator plates and supporting said coil member, and hair spring means effective upon said coil member, said inner plate portions, core member, coil, separator plates, jewel mount seats, and hair spring means all lying within the space between the planes of the upper and lower surfaces of the magnet poles.

ROBERT D. HICKOK.

Certificate of Correction

Patent No. 2,245,781. June 17, 1941.

ROBERT D. HICKOK

It is hereby certified that error appears in the printed specification of the above numbered patent requiring correction as follows:

Column 4, line 59, claim 1, after the word "unitary" insert *movement*;

and that the said Letters Patent should be read with this correction therein that the same may conform to the record of the case in the Patent Office.

Signed and sealed this 5th day of April, A. D. 1949.

[SEAL]

THOMAS F. MURPHY,
*Assistant Commissioner of Patents.*